US010448362B2

United States Patent
Li et al.

(10) Patent No.: US 10,448,362 B2
(45) Date of Patent: Oct. 15, 2019

(54) PAGING MESSAGE SENDING METHOD AND DEVICE

(71) Applicant: HUAWEI TECHNOLOGIES CO., LTD., Shenzhen, Guangdong (CN)

(72) Inventors: Jiachen Li, Shenzhen (CN); Wei Zhou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/214,626

(22) Filed: Dec. 10, 2018

(65) Prior Publication Data

US 2019/0174459 A1 Jun. 6, 2019

Related U.S. Application Data

(63) Continuation of application No. 15/904,783, filed on Feb. 26, 2018, now Pat. No. 10,178,650, which is a
(Continued)

(51) Int. Cl.
*H04W 68/00* (2009.01)
*H04W 4/00* (2018.01)
(Continued)

(52) U.S. Cl.
CPC ..... *H04W 68/025* (2013.01); *H04W 28/0268* (2013.01); *H04W 68/005* (2013.01);
(Continued)

(58) Field of Classification Search
CPC . H04W 68/025; H04W 68/005; H04W 76/11; H04W 88/16; H04W 68/04; H04W 28/0268; H04W 68/02; H04W 72/1289
(Continued)

(56) References Cited

U.S. PATENT DOCUMENTS 9,071,635 B1 6/2015 Thodupunoori
2011/0286465 A1 11/2011 Koodli et al.
(Continued)

FOREIGN PATENT DOCUMENTS

CN 102986283 A 3/2013
CN 103442425 A 12/2013
(Continued)

OTHER PUBLICATIONS

U.S. Appl. No. 15/904,783, filed Feb. 26, 2018, Jiachen Li et al., Huawei Technologies Co., Ltd.
(Continued)

*Primary Examiner* — Rafael Pérez-Gutiérrez
*Assistant Examiner* — Mark G. Pannell
(74) *Attorney, Agent, or Firm* — Leydig, Voit & Mayer, Ltd.

(57) ABSTRACT

Embodiments of the present disclosure include a mobility management entity (MME) receives a downlink data notification (DDN) message sent by a serving gateway (SGW), where the DDN message carries an identity of user equipment, and the DDN message is used to instruct the MME to send a paging message to a base station in a tracking area list (TA list) of the user equipment. After enabling an aggregate paging function, the MME determines, according to the DDN message, whether a priority of the user equipment is higher than a preset level. If the priority of the user equipment is higher than the preset level, the MME directly sends the paging message to the base station. The present disclosure is applicable to a paging message sending process.

11 Claims, 6 Drawing Sheets

Related U.S. Application Data continuation of application No. PCT/CN2015/088424, filed on Aug. 28, 2015.

(51) Int. Cl.

| | | |
|---|---|---|
| H04L 12/28 | (2006.01) | |
| H04W 68/02 | (2009.01) | |
| H04W 28/02 | (2009.01) | |
| H04W 68/04 | (2009.01) | |
| H04W 88/16 | (2009.01) | |
| H04W 76/11 | (2018.01) | |
| H04W 72/12 | (2009.01) | |

(52) U.S. Cl.
CPC ........... *H04W 68/02* (2013.01); *H04W 68/04* (2013.01); *H04W 76/11* (2018.02); *H04W 88/16* (2013.01); *H04W 72/1289* (2013.01)

(58) Field of Classification Search
USPC ....................................................... 455/458
See application file for complete search history.

(56) References Cited

U.S. PATENT DOCUMENTS

| | | |
|---|---|---|
| 2013/0012243 A1 | 1/2013 | Nishida et al. |
| 2014/0169285 A1 | 6/2014 | Sagfors et al. |
| 2015/0163149 A1 | 6/2015 | Norlander et al. |
| 2015/0230199 A1 | 8/2015 | Jeong et al. |
| 2016/0112985 A1 | 4/2016 | Cui et al. |
| 2016/0174188 A1 | 6/2016 | Kim et al. |
| 2016/0309362 A1 | 10/2016 | Yin et al. |
| 2017/0048833 A1 | 2/2017 | Lu et al. |

FOREIGN PATENT DOCUMENTS

| | | |
|---|---|---|
| CN | 104619023 A | 5/2015 |
| WO | 2014191010 A1 | 12/2014 |

OTHER PUBLICATIONS

International Search Report, dated May 10, 2016, in International Application No. PCT/CN2015/088424 (9 pp.).

Notice of Allowance, dated Sep. 6, 2018, in U.S. Appl. No. 15/904,783 (13 pp.).

PAGING MESSAGE SENDING METHOD AND DEVICE

CROSS-REFERENCE TO RELATED APPLICATIONS

This application is a continuation of U.S. patent application Ser. No. 15/904,783, filed on Feb. 26, 2018, which is a continuation of International Application No. PCT/CN2015/088424, filed on Aug. 28, 2015. All of the afore-mentioned patent applications are hereby incorporated by reference in their entireties.

TECHNICAL FIELD

The present disclosure relates to the field of communications technologies, and in particular, to a paging message sending method and a device.

BACKGROUND

In a Long Term Evolution (LTE) network, to reduce power consumption of a user equipment or to reduce radio resources used in the LTE network, the user equipment may release a radio connection link established between the user equipment and a network side after data service transmission is completed.

After the user equipment releases the radio connection link, if downlink data or downlink signaling to be sent to the user equipment exists in a wireless network, a network element, such as a mobility management entity (MME), in the wireless network needs to send a paging message to a base station in a tracking area (TA) in which the user equipment resides to find the user equipment, and transmit the downlink data or the downlink signaling to the user equipment.

However, as a quantity of paging messages increases, processing a large quantity of paging messages one by one leads to higher usage of a central processing unit (CPU) of the MME, and transmission of the large quantity of paging messages results in an increase in signaling load of an S1 interface between the MME and the base station.

In view of the foregoing problems, a Stream Control Transmission Protocol (SCTP) aggregate paging technology is proposed in the prior art. In the SCTP aggregate paging technology, a plurality of paging messages can be packaged into an SCTP data packet at an SCTP protocol layer, and the SCTP data packet is delivered to the base station. In this way, CPU usage of the MME due to processing the large quantity of paging messages one by one can be decreased, and the signaling load of the S1 interface can be reduced.

However, the following problem exists: An aggregation delay is caused during aggregate paging of a plurality of paging messages, affecting service experience of some user equipments with a relatively high priority.

SUMMARY

Embodiments of the present disclosure provide a paging message sending method and a device, so as to send a paging message specific to a user equipment with a high priority in a timely manner after an aggregate paging function is enabled, to ensure service experience of the user equipment with a high priority.

To achieve the foregoing objective, the following technical solutions are used in the embodiments of the present disclosure.

A first aspect of the embodiments of the present disclosure provides a paging message sending method, including:

receiving, by a mobility management entity MME, a downlink data notification DDN message sent by a serving gateway SGW, where the DDN message carries an identity of user equipment, and the DDN message is used to instruct the MME to send a paging message to a base station in a tracking area list TA list of the user equipment;

determining, by the MME according to the DDN message after enabling an aggregate paging function, whether a priority of the user equipment is higher than a preset level; and directly sending, by the MME, the paging message to the base station if the priority of the user equipment is higher than the preset level.

With reference to the first aspect, in a first possible implementation, the DDN message further carries a high priority paging HPP indication, and the HPP indication is used to indicate that the priority of the user equipment is higher than the preset level; and the determining, by the MME according to the DDN message after enabling an aggregate paging function, whether a priority of the user equipment is higher than a preset level includes:

after enabling the aggregate paging function, determining, by the MME, whether the DDN message carries the HPP indication; and if the DDN message carries the HPP indication, determining that the priority of the user equipment is higher than the preset level.

With reference to the first possible implementation of the first aspect, in a second possible implementation, before the receiving, by a mobility management entity MME, a downlink data notification DDN message sent by a serving gateway SGW, the method further includes:

after enabling the aggregate paging function, sending, by the MME, an aggregate paging indication to the SGW, where the aggregate paging indication is used to indicate that the MME is to send a paging message by means of aggregate paging.

With reference to the first aspect, in a third possible implementation, the determining, by the MME according to the DDN message after enabling an aggregate paging function, whether a priority of the user equipment is higher than a preset level includes:

after enabling the aggregate paging function, obtaining, by the MME, quality of service QoS information of the user equipment according to the identity of the user equipment carried in the DDN message, where the QoS information of the user equipment includes a QoS class identifier QCI and allocation/retention priority ARP information; and determining, by the MME according to the QoS information of the user equipment, whether the priority of the user equipment is higher than the preset level.

With reference to the first aspect, in a fourth possible implementation, the paging message sending method further includes:

directly sending, by the MME, a non-paging message to the base station after enabling the aggregate paging function, where the MME does not send the non-paging message by means of aggregate paging.

A second aspect of the embodiments of the present disclosure provides a mobility management entity MME, including:

a receiving unit, configured to receive a downlink data notification DDN message sent by a serving gateway SGW, where the DDN message carries an identity of user equipment, and the DDN message is used to instruct the MME to send a paging message to a base station in a tracking area list TA list of the user equipment;

a determining unit, configured to: after an aggregate paging function is enabled, determine, according to the DDN message received by the receiving unit, whether a priority of the user equipment is higher than a preset level; and a sending unit, configured to directly send the paging message to the base station if the determining unit determines that the priority of the user equipment is higher than the preset level.

With reference to the second aspect, in a first possible implementation, the DDN message further carries a high priority paging HPP indication, and the HPP indication is used to indicate that the priority of the user equipment is higher than the preset level; and the determining unit is specifically configured to:

after the aggregate paging function is enabled, determine whether the DDN message carries the HPP indication; and if the DDN message carries the HPP indication, determine that the priority of the user equipment is higher than the preset level.

With reference to the first possible implementation, in a second possible implementation, the MME further includes:

an enabling unit, configured to enable the aggregate paging function; where the sending unit is further configured to: before the receiving unit receives the DDN message sent by the SGW, send an aggregate paging indication to the SGW if the enabling unit enables the aggregate paging function, where the aggregate paging indication is used to indicate that the MME is to send a paging message by means of aggregate paging.

With reference to the second aspect, in a third possible implementation, the determining unit is specifically configured to:

after the aggregate paging function is enabled, obtain quality of service QoS information of the user equipment according to the identity of the user equipment carried in the DDN message, where the QoS information of the user equipment includes a QoS class identifier QCI and allocation/retention priority ARP information; and determine, according to the QoS information of the user equipment, whether the priority of the user equipment is higher than the preset level.

With reference to the second aspect, in a fourth possible implementation, the sending unit is further configured to directly send a non-paging message to the base station after the aggregate paging function is enabled, where the sending unit does not send the non-paging message by means of aggregate paging.

A third aspect of the embodiments of the present disclosure further provides a mobility management entity MME, including:

a receiver, configured to receive a downlink data notification DDN message sent by a serving gateway SGW, where the DDN message carries an identity of user equipment, and the DDN message is used to instruct the MME to send a paging message to a base station in a tracking area list TA list of the user equipment;

a memory, configured to store a set of program code;

a processor, configured to execute the program code stored in the memory, to determine, after enabling an aggregate paging function and according to the DDN message received by the receiver, whether a priority of the user equipment is higher than a preset level; and a transmitter, configured to directly send the paging message to the base station if the processor determines that the priority of the user equipment is higher than the preset level.

With reference to the third aspect, in a first possible implementation, the DDN message further carries a high priority paging HPP indication, and the HPP indication is used to indicate that the priority of the user equipment is higher than the preset level; and the processor is specifically configured to:

after enabling the aggregate paging function, determine whether the DDN message carries the HPP indication; and if the DDN message carries the HPP indication, determine that the priority of the user equipment is higher than the preset level.

With reference to the first possible implementation of the third aspect, in a second possible implementation, the processor is further configured to enable the aggregate paging function; and the transmitter is further configured to: before the receiver receives the DDN message sent by the SGW, send an aggregate paging indication to the SGW if the processor enables the aggregate paging function, where the aggregate paging indication is used to indicate that the MME is to send a paging message by means of aggregate paging.

With reference to the third aspect, in a third possible implementation, the processor is specifically configured to:

after enabling the aggregate paging function, obtain quality of service QoS information of the user equipment according to the identity of the user equipment carried in the DDN message, where the QoS information of the user equipment includes a QoS class identifier QCI and allocation/retention priority ARP information; and determine, according to the QoS information of the user equipment, whether the priority of the user equipment is higher than the preset level.

With reference to the third aspect, in a fourth possible implementation, the transmitter is further configured to directly send a non-paging message to the base station after the aggregate paging function is enabled, where the processor does not send the non-paging message by means of aggregate paging.

A fourth aspect of the embodiments of the present disclosure further provides a paging message sending method, where if a serving gateway SGW receives an aggregate paging indication sent by a mobility management entity MME, the method includes:

after receiving a downlink packet, obtaining, by the SGW, quality of service QoS information of a user equipment that is to receive the downlink packet, where the QoS information of the user equipment includes a QoS class identifier QCI and allocation/retention priority ARP information; and if the SGW determines, according to the QoS information of the user equipment, that a priority of the user equipment is higher than a preset level, sending, to the MME, a downlink data notification DDN message that carries a high priority paging HPP indication, where the aggregate paging indication is used to indicate that the MME is to send a paging message by means of aggregate paging; and the DDN message is used to instruct the MME to send a paging message to a base station in a tracking area list TA list of the user equipment, where the HPP indication is used to indicate that the priority of the user equipment is higher than the preset level.

A fifth aspect of the embodiments of the present disclosure provides a serving gateway SGW, including:

a receiving unit, configured to receive an aggregate paging indication sent by a mobility management entity MME, and receive a downlink packet;

an obtaining unit, configured to: if the receiving unit receives the aggregate paging indication and after the receiving unit receives the downlink packet, obtain quality of service QoS information of a user equipment that is to receive the downlink packet, where the QoS information of the user equipment includes a QoS class identifier QCI and allocation/retention priority ARP information;

a determining unit, configured to determine, according to the QoS information of the user equipment, whether a priority of the user equipment is higher than a preset level; and a sending unit, configured to: if the determining unit determines that the priority of the user equipment is higher than the preset level, send, to the MME, a downlink data notification DDN message that carries a high priority paging HPP indication, where the aggregate paging indication is used to indicate that the MME is to send a paging message by means of aggregate paging; and the DDN message is used to instruct the MME to send a paging message to a base station in a tracking area list TA list of the user equipment, where the HPP indication is used to indicate that the priority of the user equipment is higher than the preset level.

A sixth aspect of the embodiments of the present disclosure further provides a serving gateway SGW, including:

a receiver, configured to receive an aggregate paging indication sent by a mobility management entity MME, and receive a downlink packet;

a memory, configured to store a set of program code;

a processor, configured to execute the program code stored in the memory to: obtain, if the receiving unit receives the downlink packet and after the receiver receives the aggregate paging indication, quality of service QoS information of a user equipment that is to receive the downlink packet; and determine, according to the QoS information of the user equipment, whether a priority of the user equipment is higher than a preset level, where the QoS information of the user equipment includes a QoS class identifier QCI and allocation/retention priority ARP information; and a transmitter, configured to: if the processor determines that the priority of the user equipment is higher than the preset level, send, to the MME, a downlink data notification DDN message that carries a high priority paging HPP indication, where the aggregate paging indication is used to indicate that the MME is to send a paging message by means of aggregate paging; and the DDN message is used to instruct the MME to send a paging message to a base station in a tracking area list TA list of the user equipment, where the HPP indication is used to indicate that the priority of the user equipment is higher than the preset level.

According to the paging message sending method and the device provided in the embodiments of the present disclosure, the MME receives the DDN message sent by the SGW, where the DDN message carries the identity of the user equipment, and the DDN message is used to instruct the MME to send the paging message to the base station in the TA list of the user equipment; after enabling the aggregate paging function, determines, according to the DDN message, whether the priority of the user equipment is higher than the preset level; and directly sends the paging message to the base station if the priority of the user equipment is higher than the preset level.

According to the solutions, when the priority of the user equipment is higher than the preset level, the MME can directly send the paging message to the base station, without sending the paging message by means of aggregate paging. Therefore, no aggregation delay is caused, so that a paging message specific to user equipment with a high priority can be sent in a timely manner, and service experience of the user equipment with a high priority can be ensured.

BRIEF DESCRIPTION OF DRAWINGS

To describe the technical solutions in the embodiments of the present disclosure more clearly, the following briefly describes the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
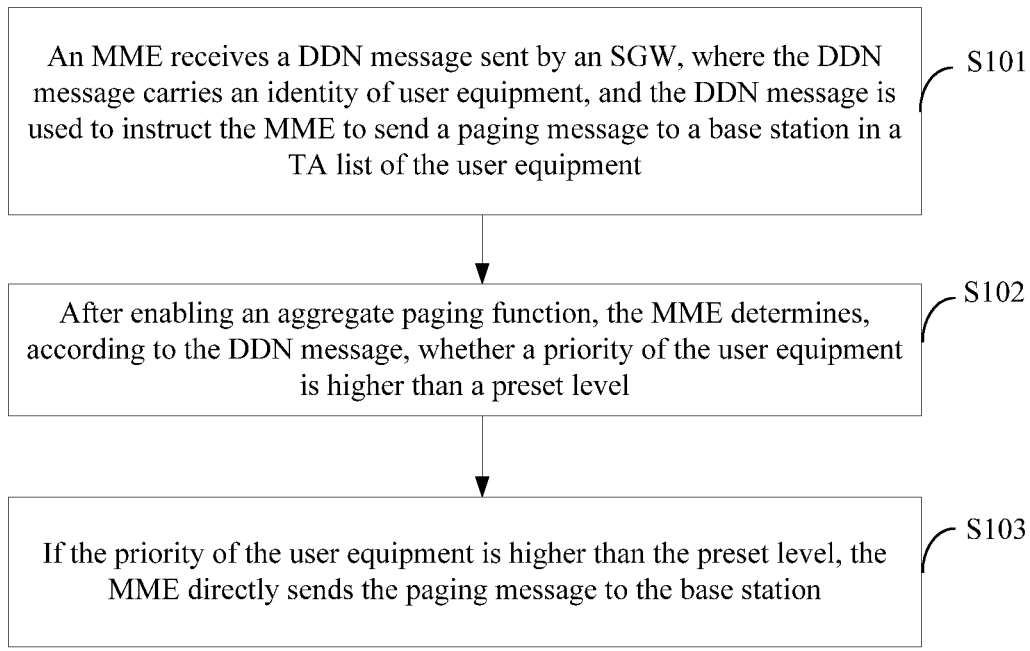
FIG. 1 is a schematic flowchart of a paging message sending method according to an embodiment of the present disclosure.

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Various technologies described in this specification may be used in a LTE system and another communications system of a same type.

User equipment in the embodiments of the present disclosure may be a wireless terminal. The wireless terminal may be a device that provides voice and/or data connectivity for a user, a handheld device with a wireless connection function, or another processing device connected to a wireless modem. The wireless terminal may communicate with one or more core networks by using a radio access network (RAN). The wireless terminal may be a mobile terminal, such as a mobile phone (or referred to as a "cellular" phone) or a computer with a mobile terminal. For example, the mobile terminal may be a portable, pocket-sized, handheld, computer built-in, or in-vehicle mobile apparatus, and exchanges voice and/or data with the radio access network. For example, the wireless terminal may be a device such as a personal communications service (PCS) phone, a cordless telephone set, a Session Initiation Protocol (SIP) phone, a wireless local loop (WLL) station, or a personal digital assistant (PDA). The wireless terminal may alternatively be referred to as a system, a subscriber unit, a subscriber station, a mobile station, a remote station, an access point, a remote terminal, an access terminal, a user terminal, a user agent, a user device, or a user equipment.

A base station (for example, an access point) may be a device that communicates with a wireless terminal over an air interface in an access network by using one or more sectors. The base station may be configured to perform mutual conversion between a received over-the-air frame and an IP packet and serve as a router between the wireless terminal and a remaining portion of the access network, where the remaining portion of the access network may include an Internet Protocol (IP) network. The base station may further coordinate attribute management of the air interface. For example, the base station may be an evolved NodeB (eNB, or e-NodeB) in LTE.

In addition, terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, a character "/" in this specification usually indicates an "or" relationship between the associated objects.

A paging message sending method and a device provided in the embodiments of the present disclosure may be applied to a process of paging user equipment after an MME enables an aggregate paging function in an LTE network.

The following describes in detail, by using specific embodiments, the paging message sending method and the device provided in the present disclosure.

Embodiment 1

This embodiment of the present disclosure provides a paging message sending method, applied to a MME. As shown in FIG. 1, the method includes the following steps.

S101: The MME receives a downlink data notification (DDN) message sent by a serving gateway (SGW).

The DDN message carries an identity of user equipment, and the DDN message is used to instruct the MME to send a paging message to a base station in a tracking area list (TA List) of the user equipment.

When downlink data or downlink signaling to be sent to user equipment exists on a network side, and the user equipment has not established a radio connection link with the network side, the SGW may send a DDN message to the MME, to instruct the MME to send a paging message to a base station in a TA list of the user equipment. The base station in this embodiment of the present disclosure may be a NodeB, an eNB, or an e-NodeB in LTE. A TA list includes 1 to 16 tracking areas (TA). The MME may allocate one TA list to each user equipment, and send a TA list allocated to user equipment to the user equipment; and the user equipment stores its TA list.

TA is a concept created for location management of user equipment in an LTE system. A TA function is similar to functions of a location area (LA) and a routing area (RA) in a 3G system. A core network device (for example, the MME) can learn of a location of user equipment in an idle state according to TA information, and page the user equipment when there is a data service requirement.

When there is relatively much paging signaling, the MME enables an aggregate paging function. This embodiment of the present disclosure is implemented when the MME has enabled the aggregate paging function.

S102: After enabling an aggregate paging function, the MME determines, according to the DDN message, whether a priority of user equipment is higher than a preset level.

For example, in an application scenario of this embodiment of the present disclosure, the DDN message carries a high priority paging (HPP) indication, and the HPP indication is used to indicate that the priority of the user equipment is higher than the preset level.

After receiving the DDN message that carries the HPP indication, the MME may determine that the priority of the user equipment is higher than the preset level, and may directly send a paging message to a base station in a TA list of the user equipment.

The HPP indication may be added by the SGW to the DDN message after the SGW receives an aggregate paging indication sent by the MME. The MME may send the aggregate paging indication after enabling the aggregate paging function.

In a second application scenario of this embodiment of the present disclosure, the DDN message does not carry an HPP indication.

In the second application scenario, after receiving the DDN message, the MME may obtain quality of service (QoS) information of the user equipment according to the identity of the user equipment carried in the DDN message, and determine, according to the QoS information of the user equipment, whether the priority of the user equipment is higher than the preset level.

The QoS information of the user equipment includes a QoS class identifier (QCI) and allocation/retention priority (ARP) information.

S103: If the priority of the user equipment is higher than the preset level, the MME directly sends a paging message to a base station.

When the priority of the user equipment is higher than the preset level, the MME does not send the corresponding paging message by means of aggregate paging, but directly sends the paging message to the base station in the TA list of the user equipment.

According to the paging message sending method provided in this embodiment of the present disclosure, the MME receives the DDN message sent by the SGW, where the DDN message carries the identity of the user equipment, and the DDN message is used to instruct the MME to send the paging message to the base station in the TA list of the user equipment; after enabling the aggregate paging function, determines, according to the DDN message, whether the priority of the user equipment is higher than the preset level; and directly sends the paging message to the base station if the priority of the user equipment is higher than the preset level.

According to this solution, when the priority of the user equipment is higher than the preset level, the MME can directly send the paging message to the base station, without sending the paging message by means of aggregate paging. Therefore, no aggregation delay is caused, so that a paging message specific to user equipment with a high priority can be sent in a timely manner, and service experience of the user equipment with a high priority can be ensured.

Embodiment 2

Figure 2:
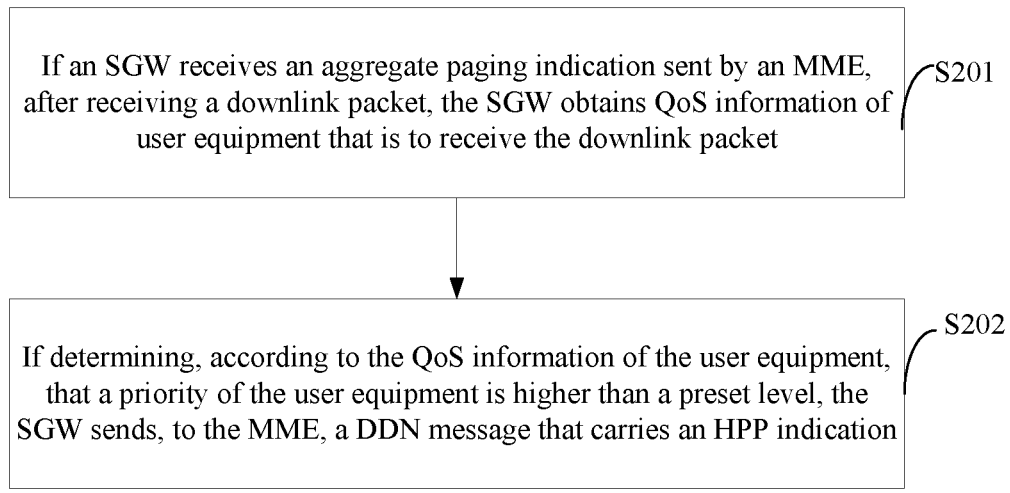
FIG. 2 is a schematic flowchart of a paging message sending method according to an embodiment of the present disclosure.

This embodiment of the present disclosure provides a paging message sending method, applied to an SGW. As shown in FIG. 2, the paging message sending method includes the following steps.

S201: If the SGW receives an aggregate paging indication sent by an MME, after receiving a downlink packet, the SGW obtains QoS information of user equipment that is to receive the downlink packet.

The aggregate paging indication is sent to the SGW by the MME after the MME enables an aggregate paging function. The aggregate paging indication is used to indicate that the MME is to send a paging message by means of aggregate paging.

When the SGW learns that the MME has enabled the aggregate paging function and is to send a paging message by means of aggregate paging, to prevent a case in which service experience of some user equipments with a relatively high priority is affected because the MME sends all paging messages by means of aggregate paging, after receiving the downlink packet, the SGW may obtain the QoS information of the user equipment that is to receive the downlink packet, and then determine, according to the QoS information, whether a priority of the user equipment is higher than a preset level; and when the priority of the user equipment is higher than the preset level, send, to the MME, a DDN message that carries an HPP indication, to instruct the MME to directly send a paging message to a base station in a TA list of the user equipment, without a need to perform aggregate paging.

S202: If determining, according to the QoS information of the user equipment, that a priority of the user equipment is higher than a preset level, the SGW sends, to the MME, a DDN message that carries an HPP indication.

The DDN message is used to instruct the MME to send a paging message to the base station in the TA list of the user equipment, and the HPP indication is used to indicate that the priority of the user equipment is higher than the preset level.

The priority of the user equipment may be indicated by a QCI parameter in the QoS information of the user equipment in the SGW.

According to the paging message sending method provided in this embodiment of the present disclosure, after receiving the aggregate paging indication sent by the MME and if receiving the downlink packet, the SGW may obtain the QoS information of the user equipment that is to receive the downlink packet; and if determining, according to the QoS information of the user equipment, that the priority of the user equipment is higher than the preset level, the SGW sends, to the MME, the DDN message that carries the HPP indication.

According to this solution, when the priority of the user equipment is higher than the preset level, the SGW can send, to the MME, the DDN message that carries the HPP indication, to instruct the MME to directly send the paging message to the base station without sending the paging message by means of aggregate paging. Therefore, no aggregation delay is caused, so that a paging message specific to user equipment with a high priority can be sent in a timely manner, and service experience of the user equipment with a high priority can be ensured.

Embodiment 3

Figure 3:
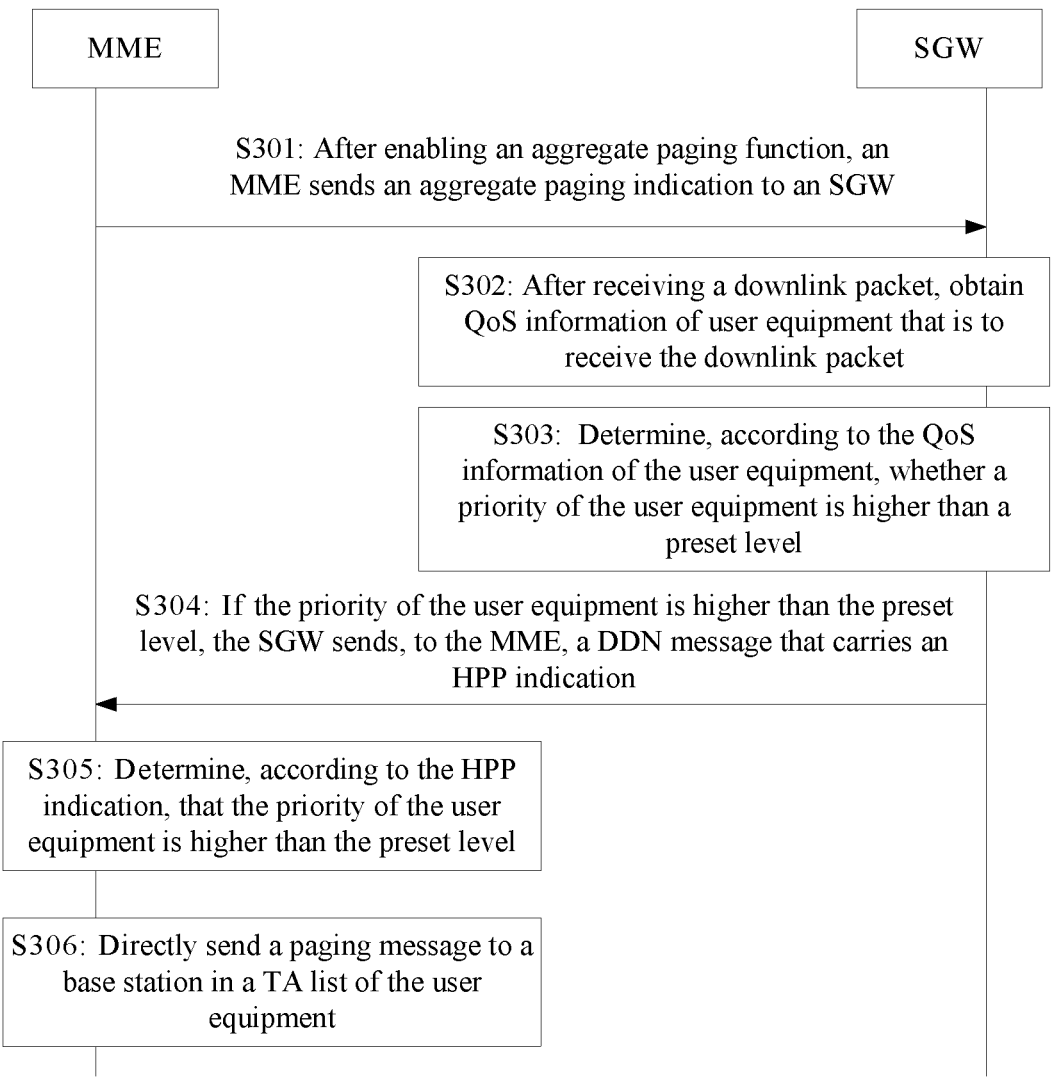
FIG. 3 is a schematic flowchart of a paging message sending method according to an embodiment of the present disclosure.

This embodiment of the present disclosure provides a paging message sending method. The method may be applied to a process of interaction between an MME and an SGW. As shown in FIG. 3, the paging message sending method may include the following steps.

S301: After enabling an aggregate paging function, the MME sends an aggregate paging indication to the SGW, where the aggregate paging indication is used to indicate that the MME is to send a paging message by means of aggregate paging.

S302: After receiving a downlink packet, the SGW obtains QoS information of user equipment that is to receive the downlink packet.

For example, the SGW may parse the received downlink packet, to obtain an address or identity of the user equipment that is to receive the downlink packet, and then obtain the QoS information of the user equipment according to the address or identity of the user equipment obtained by means of parsing.

S303: The SGW determines, according to the QoS information of the user equipment, whether a priority of the user equipment is higher than a preset level.

It should be noted that, for a specific method for determining, by the SGW according to the QoS information of the user equipment, whether the priority of the user equipment is higher than the preset level, refer to related descriptions in the foregoing embodiments, and details are not repeated herein in this embodiment.

When the SGW learns that the MME has enabled the aggregate paging function and is to send a paging message by means of aggregate paging, to prevent a case in which service experience of some user equipments with a relatively high priority is affected because the MME sends all paging messages by means of aggregate paging, after receiving the downlink packet, the SGW may determine whether the priority of the user equipment is higher than the preset level; and when the priority of the user equipment is higher than the preset level, send, to the MME, a DDN message that carries an HPP indication, to instruct the MME to directly send a paging message to a base station in a TA list of the user equipment, without a need to perform aggregate paging.

S304: If the priority of the user equipment is higher than the preset level, the SGW sends, to the MME, a DDN message that carries an HPP indication.

The DDN message is used to instruct the MME to send a paging message to the base station in the TA list of the user equipment, and the HPP indication is used to indicate that the priority of the user equipment is higher than the preset level.

Further, if determining that the priority of the user equipment is not higher than the preset level, the SGW may send, to the MME, a DDN message that does not carry the HPP indication.

S305: The MME determines, according to the HPP indication, that the priority of the user equipment is higher than the preset level.

After receiving the DDN message that carries the HPP indication, the MME may determine that the priority of the user equipment is higher than the preset level.

S306: The MME directly sends a paging message to a base station in a TA list of the user equipment.

After determining that the priority of the user equipment is higher than the preset level, the MME may directly send the paging message to the base station in the TA list of the user equipment.

Further, if receiving the DDN message that does not carry the HPP indication, the MME may send the paging message by means of aggregate paging.

It should be noted that the MME and the base station (NodeB, eNB, or e-NodeB) perform communication by using an S1 interface, that is, the MME may send the paging message to the base station by using the S1 interface.

According to the paging message sending method provided in this embodiment of the present disclosure, the MME may receive the DDN message sent by the SGW, where the DDN message carries the identity of the user equipment, and the DDN message is used to instruct the MME to send the paging message to the base station in the TA list of the user equipment; after enabling the aggregate paging function, determine, according to the DDN message, whether the priority of the user equipment is higher than the preset level; and directly send the paging message to the base station if the priority of the user equipment is higher than the preset level.

According to this solution, when the priority of the user equipment is higher than the preset level, the MME can directly send the paging message to the base station, without sending the paging message by means of aggregate paging. Therefore, no aggregation delay is caused, so that a paging message specific to user equipment with a high priority can be sent in a timely manner, and service experience of the user equipment with a high priority can be ensured.

Embodiment 4

Figure 4:
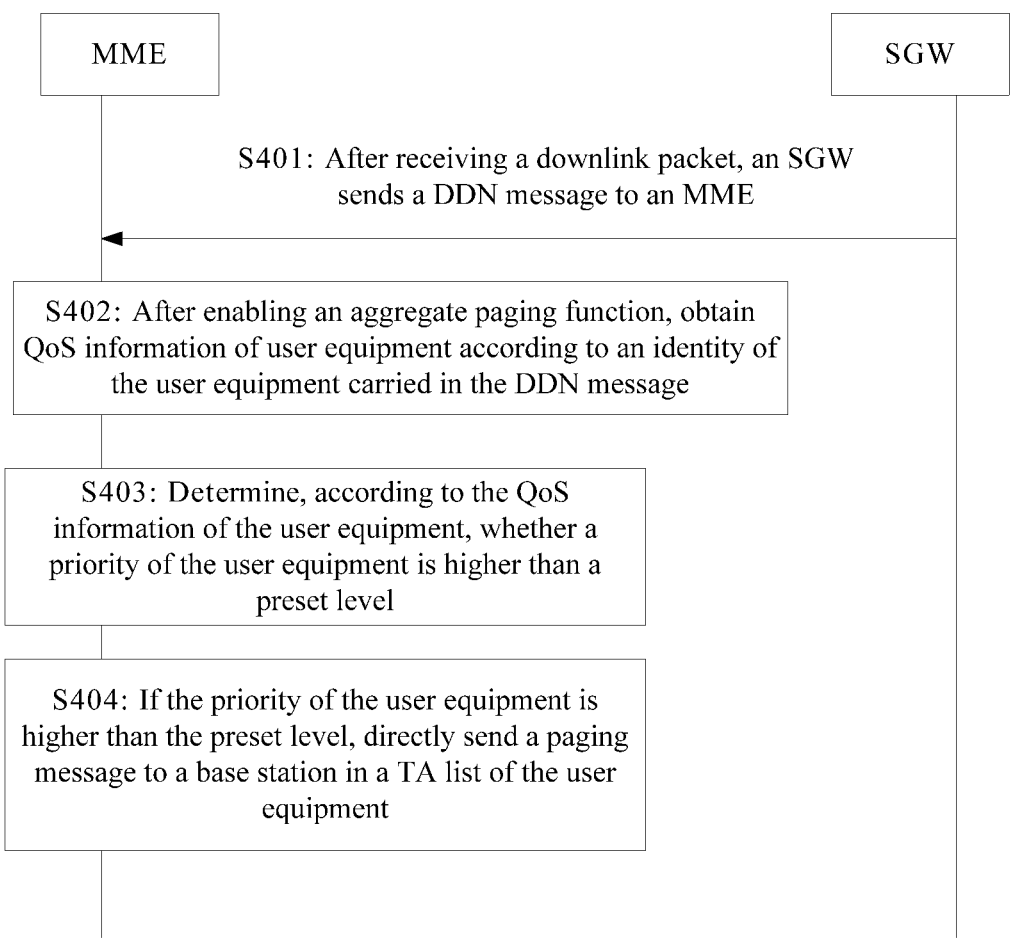
FIG. 4 is a schematic flowchart of a paging message sending method according to an embodiment of the present disclosure.

This embodiment of the present disclosure provides a paging message sending method. The method may be applied to a process of interaction between an MME and an SGW. In this embodiment, the MME does not need to provide a notification to the SGW after enabling an aggregate paging function. As shown in FIG. 4, the paging message sending method may include the following steps.

S401: After receiving a downlink packet, the SGW sends a DDN message to the MME.

The DDN message carries an identity of user equipment, and the DDN message is used to instruct the MME to send a paging message to a base station in a TA list of the user equipment.

S402: After enabling an aggregate paging function, the MME obtains QoS information of user equipment according to an identity of the user equipment carried in the DDN message.

The QoS information of the user equipment includes a QCI and ARP information.

S403: The MME determines, according to the QoS information of the user equipment, whether a priority of the user equipment is higher than a preset level.

It should be noted that a method for determining, by the MME according to the QoS information of the user equipment, whether the priority of the user equipment is higher than the preset level is similar to a method for determining, by the SGW according to the QoS information of the user equipment, whether the priority of the user equipment is higher than the preset level, and details are not repeated herein in this embodiment of the present disclosure.

S404: If the priority of the user equipment is higher than the preset level, the MME directly sends a paging message to a base station in a TA list of the user equipment.

It should be noted that the MME and the base station (NodeB, eNB, or e-NodeB) perform communication by using an S1 interface, that is, the MME may send the paging message to the base station by using the S1 interface.

According to the paging message sending method provided in this embodiment of the present disclosure, the MME may receive the DDN message sent by the SGW, where the DDN message carries the identity of the user equipment, and the DDN message is used to instruct the MME to send the paging message to the base station in the TA list of the user equipment; determine, according to the DDN message, whether the priority of the user equipment is higher than the preset level; and directly send the paging message to the base station if the priority of the user equipment is higher than the preset level.

According to this solution, when the priority of the user equipment is higher than the preset level, the MME can directly send the paging message to the base station, without sending the paging message by means of aggregate paging. Therefore, no aggregation delay is caused, so that a paging message specific to user equipment with a high priority can be sent in a timely manner, and service experience of the user equipment with a high priority can be ensured.

Embodiment 5

Figure 5:
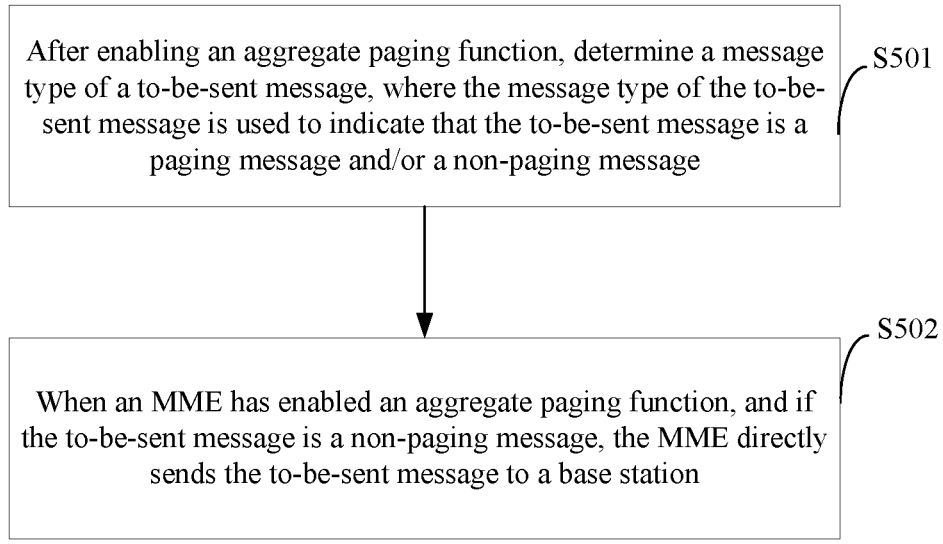
FIG. 5 is a schematic flowchart of a paging message sending method according to an embodiment of the present disclosure.

This embodiment of the present disclosure provides a paging message sending method. The method may be applied to a process of interaction between an MME and an SGW. As shown in FIG. 5, the paging message sending method may include the following steps.

S501: After enabling an aggregate paging function, the MME determines a message type of a to-be-sent message, where the message type of the to-be-sent message is used to indicate that the to-be-sent message is a paging message and/or a non-paging message.

A message header (for example, a packet header) of the to-be-sent message includes message type indication information of the to-be-sent message. The MME may determine the message type of the to-be-sent message by parsing the message header.

S502: If the to-be-sent message is a non-paging message, the MME directly sends the to-be-sent message to a base station.

It should be noted that the MME and the base station (NodeB, eNB, or e-NodeB) perform communication by using an S1 interface, that is, the MME may send the non-paging message to the base station by using the S1 interface.

According to the paging message sending method provided in this embodiment of the present disclosure, when the MME sends the non-paging message to the base station by using the S1 interface, the non-paging message does not need to be sent by means of aggregate paging, that is, the MME can directly send the non-paging message to the base station. This can ensure timely transmission of the non-paging message and reliability of a non-paging service.

Embodiment 6

Figure 6:
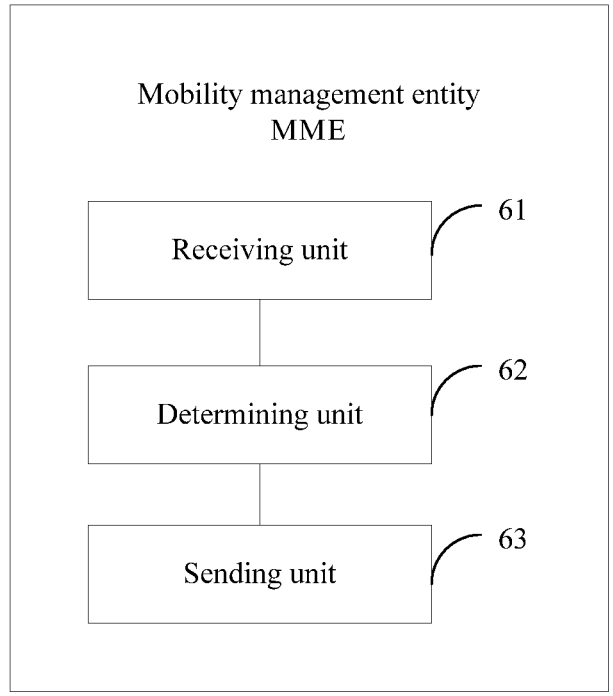
FIG. 6 is a schematic structural composition diagram of an MME according to an embodiment of the present disclosure.

This embodiment of the present disclosure provides an MME. As shown in FIG. 6, the MME includes a receiving unit 61, a determining unit 62, and a sending unit 63.

The receiving unit 61 is configured to receive a downlink data notification DDN message sent by a serving gateway SGW, where the DDN message carries an identity of user equipment, and the DDN message is used to instruct the MME to send a paging message to a base station in a tracking area list TA list of the user equipment.

The determining unit 62 is configured to: after an aggregate paging function is enabled, determine, according to the DDN message received by the receiving unit 61, whether a priority of the user equipment is higher than a preset level.

The sending unit 63 is configured to directly send the paging message to the base station if the determining unit 62 determines that the priority of the user equipment is higher than the preset level.

Further, in a first application scenario of this embodiment of the present disclosure, the DDN message further carries a high priority paging HPP indication, and the HPP indication is used to indicate that the priority of the user equipment is higher than the preset level.

Correspondingly, the determining unit 62 is specifically configured to:

after the aggregate paging function is enabled, determine whether the DDN message carries the HPP indication; and if the DDN message carries the HPP indication, determine that the priority of the user equipment is higher than the preset level.

Figure 7:
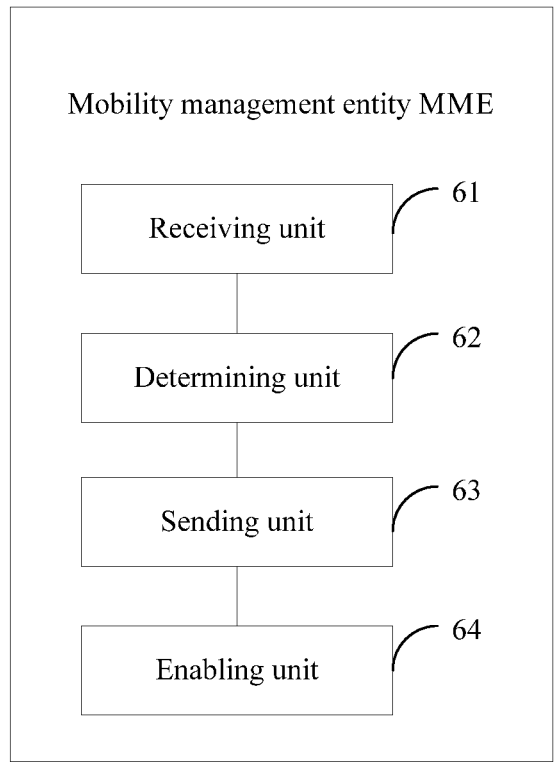
FIG. 7 is a schematic structural composition diagram of another MME according to an embodiment of the present disclosure.

Further, in the first application scenario of this embodiment of the present disclosure, as shown in FIG. 7, the MME may further include an enabling unit 64.

The enabling unit 64 is configured to enable the aggregate paging function.

The sending unit 63 is further configured to: before the receiving unit 61 receives the DDN message sent by the SGW, send an aggregate paging indication to the SGW if the enabling unit 64 enables the aggregate paging function.

The aggregate paging indication is used to indicate that the MME is to send a paging message by means of aggregate paging.

Further, in a second application scenario of this embodiment of the present disclosure, the determining unit 62 is specifically configured to:

after the aggregate paging function is enabled, obtain quality of service QoS information of the user equipment according to the identity of the user equipment carried in the DDN message, where the QoS information of the user equipment includes a QoS class identifier QCI and allocation/retention priority ARP information; and determine, according to the QoS information of the user equipment, whether the priority of the user equipment is higher than the preset level.

Further, the sending unit 63 is configured to directly send a non-paging message to the base station after the aggregate paging function is enabled.

The sending unit 63 does not send the non-paging message by means of aggregate paging.

It should be noted that, for a specific description of some functional modules in the MME provided in this embodiment of the present disclosure, refer to corresponding content in the second aspect of the embodiments of the present disclosure, and details are not repeated herein in this embodiment.

The MME provided in this embodiment of the present disclosure may receive the DDN message sent by the SGW, where the DDN message carries the identity of the user equipment, and the DDN message is used to instruct the MME to send the paging message to the base station in the TA list of the user equipment; after enabling the aggregate paging function, determine, according to the DDN message, whether the priority of the user equipment is higher than the preset level; and directly send the paging message to the base station if the priority of the user equipment is higher than the preset level.

According to this solution, when the priority of the user equipment is higher than the preset level, the MME can directly send the paging message to the base station, without sending the paging message by means of aggregate paging. Therefore, no aggregation delay is caused, so that a paging message specific to user equipment with a high priority can be sent in a timely manner, and service experience of the user equipment with a high priority can be ensured.

Embodiment 7

Figure 8:
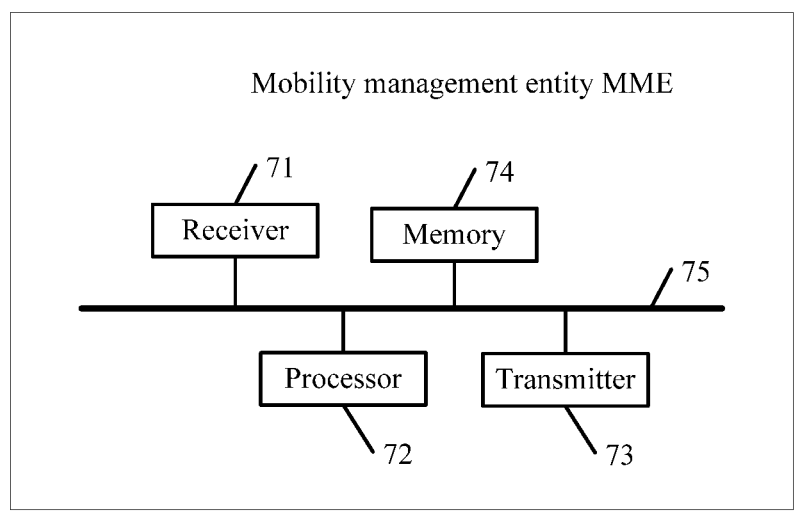
FIG. 8 is a schematic structural composition diagram of another MME according to an embodiment of the present disclosure.

This embodiment of the present disclosure provides an MME. As shown in FIG. 8, the MME includes a receiver 71, a processor 72, a transmitter 73, and a memory 74. The receiver 71, the processor 72, the transmitter 73, and the memory 74 are connected to and communicate with each other by using a system bus 75. The processor 72 may instruct the receiver 71 and the transmitter 73 to execute a related process. The receiver 71 is configured to receive a downlink data notification DDN message sent by a serving gateway SGW, where the DDN message carries an identity of user equipment, and the DDN message is used to instruct the MME to send a paging message to a base station in a tracking area list TA list of the user equipment.

The memory 74 is configured to store a set of program code.

The processor 72 is configured to execute the program code stored in the memory 74, to determine, after enabling an aggregate paging function and according to the DDN message received by the receiver 71, whether a priority of the user equipment is higher than a preset level.

The transmitter 73 is configured to directly send the paging message to the base station if the processor 72 determines that the priority of the user equipment is higher than the preset level.

For example, the processor 72 may be a central processing unit (CPU), or an application-specific integrated circuit (ASIC), or one or more integrated circuits configured to implement this embodiment of the present disclosure.

The receiver 71 and the transmitter 73 each may be a communications interface, for example, a radio frequency (RF) module, used by the MME to communicate with another device.

The memory 74 may include a volatile memory, for example, a random access memory (RAM). The memory 74 may alternatively include a non-volatile memory, for example, a read-only memory (ROM), a flash memory, a hard disk drive (HDD), or a solid-state drive (SSD). The memory 74 may alternatively include a combination of the foregoing types of memories.

Further, in a first application scenario of this embodiment of the present disclosure, the DDN message further carries a high priority paging HPP indication, and the HPP indication is used to indicate that the priority of the user equipment is higher than the preset level.

Correspondingly, the processor is specifically configured to:

after enabling the aggregate paging function, determine whether the DDN carries the HPP indication; and if the DDN message carries the HPP indication, determine that the priority of the user equipment is higher than the preset level.

Further, in the first application scenario of this embodiment of the present disclosure, the processor 72 is further configured to enable the aggregate paging function.

The transmitter 73 is further configured to: before the receiver 71 receives the DDN message sent by the SGW, send an aggregate paging indication to the SGW if the processor 72 enables the aggregate paging function.

The aggregate paging indication is used to indicate that the MME is to send a paging message by means of aggregate paging.

Further, in a second application scenario of this embodiment of the present disclosure, the processor 72 is specifically configured to:

after enabling the aggregate paging function, obtain quality of service QoS information of the user equipment according to the identity of the user equipment carried in the DDN message, where the QoS information of the user equipment includes a QoS class identifier QCI and allocation/retention priority ARP information; and determine, according to the QoS information of the user equipment, whether the priority of the user equipment is higher than the preset level.

Further, the transmitter 73 is configured to directly send a non-paging message to the base station after the aggregate paging function is enabled.

The processor 72 does not send the non-paging message by means of aggregate paging.

It should be noted that, for a specific description of some functional modules in the MME provided in this embodiment of the present disclosure, refer to corresponding content in the third aspect of the embodiments of the present disclosure, and details are not repeated herein in this embodiment.

The MME provided in this embodiment of the present disclosure may receive the DDN message sent by the SGW, where the DDN message carries the identity of the user equipment, and the DDN message is used to instruct the MME to send the paging message to the base station in the TA list of the user equipment; determine, according to the DDN message, whether the priority of the user equipment is higher than the preset level; and directly send the paging message to the base station if the priority of the user equipment is higher than the preset level.

According to this solution, when the priority of the user equipment is higher than the preset level, the MME can directly send the paging message to the base station, without sending the paging message by means of aggregate paging. Therefore, no aggregation delay is caused, so that a paging message specific to user equipment with a high priority can be sent in a timely manner, and service experience of the user equipment with a high priority can be ensured.

Embodiment 8

Figure 9:
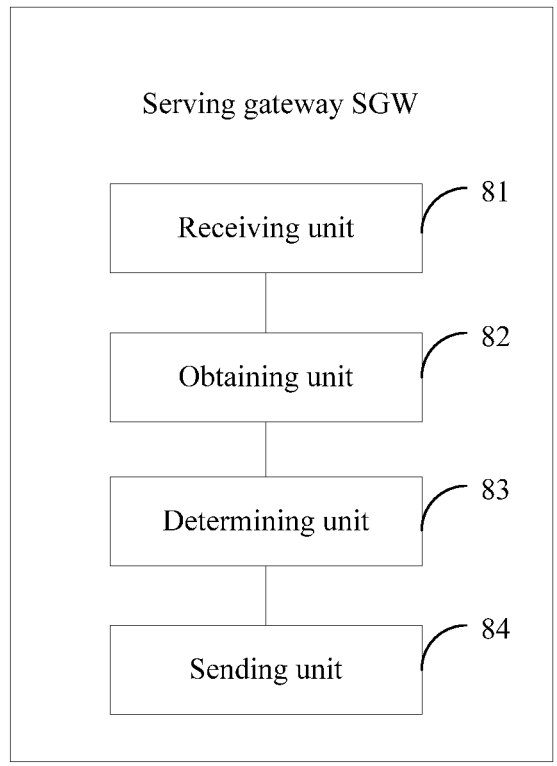
FIG. 9 is a schematic structural composition diagram of an SGW according to an embodiment of the present disclosure.

This embodiment of the present disclosure provides an SGW. As shown in FIG. 9, the SGW includes a receiving unit 81, an obtaining unit 82, a determining unit 83, and a sending unit 84.

The receiving unit 81 is configured to receive an aggregate paging indication sent by a mobility management entity MME, and receive a downlink packet.

The obtaining unit 82 is configured to: if the receiving unit 81 receives the aggregate paging indication and after the receiving unit 81 receives the downlink packet, obtain quality of service QoS information of user equipment that is to receive the downlink packet, where the QoS information of the user equipment includes a QoS class identifier QCI and allocation/retention priority ARP information.

The determining unit 83 is configured to determine, according to the QoS information of the user equipment, whether a priority of the user equipment is higher than a preset level.

The sending unit 84 is configured to: if the determining unit 83 determines that the priority of the user equipment is higher than the preset level, send, to the MME, a downlink data notification DDN message that carries a high priority paging HPP indication.

The aggregate paging indication is used to indicate that the MME is to send a paging message by means of aggregate paging.

The DDN message is used to instruct the MME to send a paging message to a base station in a tracking area list TA list of the user equipment, where the HPP indication is used to indicate that the priority of the user equipment is higher than the preset level.

It should be noted that, for a specific description of some functional modules in the SGW provided in this embodiment of the present disclosure, refer to corresponding content in the fifth aspect of the embodiments of the present disclosure, and details are not repeated herein in this embodiment.

After receiving the aggregate paging indication sent by the MME and if receiving the downlink packet, the SGW provided in this embodiment of the present disclosure may obtain the QoS information of the user equipment that is to receive the downlink packet; and if determining, according to the QoS information of the user equipment, that the priority of the user equipment is higher than the preset level, the SGW sends, to the MME, the DDN message that carries the HPP indication.

According to this solution, when the priority of the user equipment is higher than the preset level, the SGW can send, to the MME, the DDN message that carries the HPP indication, to instruct the MME to directly send the paging message to the base station without sending the paging message by means of aggregate paging. Therefore, no aggregation delay is caused, so that a paging message specific to user equipment with a high priority can be sent in a timely manner, and service experience of the user equipment with a high priority can be ensured.

Embodiment 9

Figure 10:
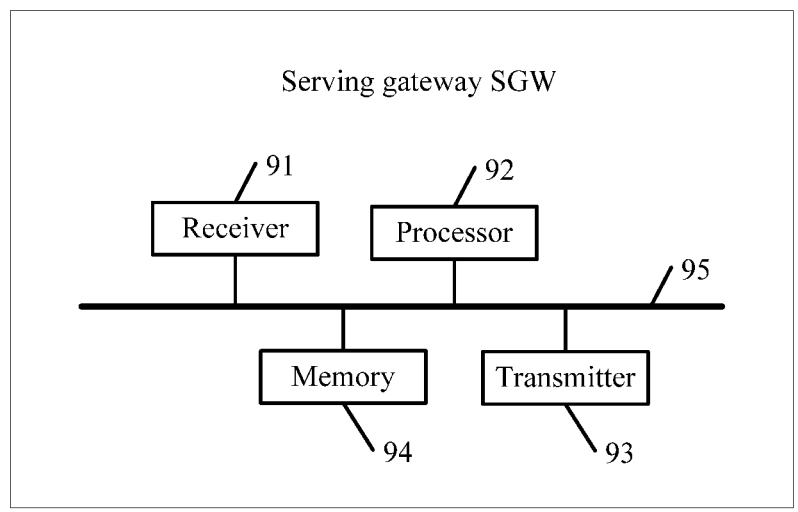
FIG. 10 is a schematic structural composition diagram of another SGW according to an embodiment of the present disclosure.

This embodiment of the present disclosure provides an SGW. As shown in FIG. 10, the SGW includes a receiver 91, a processor 92, a transmitter 93, and a memory 94. The receiver 91, the processor 92, the transmitter 93, and the memory 94 are connected to and communicate with each other by using a system bus 95. The processor 92 may instruct the receiver 91 and the transmitter 93 to execute a related process.

The receiver 91 is configured to receive an aggregate paging indication sent by a mobility management entity MME, and receive a downlink packet.

The memory 94 is configured to store a set of program code.

The processor 92 is configured to execute the program code stored in the memory 94 to: obtain, if the receiving unit receives the downlink packet and after the receiver 91 receives the aggregate paging indication, quality of service QoS information of user equipment that is to receive the downlink packet; and determine, according to the QoS information of the user equipment, whether a priority of the user equipment is higher than a preset level, where the QoS information of the user equipment includes a QoS class identifier QCI and allocation/retention priority ARP information.

The transmitter 93 is configured to: if the processor 92 determines that the priority of the user equipment is higher than the preset level, send, to the MME, a downlink data notification DDN message that carries a high priority paging HPP indication.

The aggregate paging indication is used to indicate that the MME is to send a paging message by means of aggregate paging.

The DDN message is used to instruct the MME to send a paging message to a base station in a tracking area list TA list of the user equipment, where the HPP indication is used to indicate that the priority of the user equipment is higher than the preset level.

For example, the processor 92 may be a CPU, an ASIC, or one or more integrated circuits configured to implement this embodiment of the present disclosure.

The receiver 91 and the transmitter 93 each may be a communications interface, for example, an RF module, used by the SGW to communicate with another device.

The memory 94 may include a volatile memory, for example, a RAM. The memory 94 may alternatively include an NVM, for example, a ROM, a flash memory, an HDD, or an SSD. The memory 94 may alternatively include a combination of the foregoing types of memories.

It should be noted that, for a specific description of some functional modules in the SGW provided in this embodiment of the present disclosure, refer to corresponding content in the sixth aspect of the embodiments of the present disclosure, and details are not repeated herein in this embodiment.

After receiving the aggregate paging indication sent by the MME and if receiving the downlink packet, the SGW provided in this embodiment of the present disclosure may obtain the QoS information of the user equipment that is to receive the downlink packet; and if determining, according to the QoS information of the user equipment, that the priority of the user equipment is higher than the preset level, the SGW sends, to the MME, the DDN message that carries the HPP indication.

According to this solution, when the priority of the user equipment is higher than the preset level, the SGW can send, to the MME, the DDN message that carries the HPP indication, to instruct the MME to directly send the paging message to the base station without sending the paging message by means of aggregate paging. Therefore, no aggregation delay is caused, so that a paging message specific to user equipment with a high priority can be sent in a timely manner, and service experience of the user equipment with a high priority can be ensured.

The foregoing descriptions about implementation manners allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or part of the functions described above. For a detailed working process of the foregoing system, apparatus, and unit, refer to a corresponding process in the foregoing method embodiments. Details are not repeated herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The computer software product is stored in a storage medium and includes several instructions for instructing a computer device (which may be a personal computer, a server, a network device, or the like) or a processor to perform all or a part of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A paging message sending method, comprising:
 receiving, by a serving gateway (SGW), an aggregate paging indication from a mobility management entity (MME);
 after receiving a downlink packet, obtaining, by the SGW, quality of service (QoS) information of a user equipment that is to receive the downlink packet, wherein the QoS information of the user equipment comprises a QoS class identifier (QCI) and allocation/retention priority (ARP) information;

determining, by the SGW, whether a priority of the user equipment is higher than a preset level according to the QoS information of the user equipment; and in response to determining that the priority of the user equipment is higher than the preset level, sending, by the SGW to the MME, a downlink data notification (DDN) message that carries a high priority paging (HPP) indication.

2. The method according to claim 1, wherein the aggregate paging indication is used to indicate that the MME is to send a paging message by means of aggregate paging.

3. The method according to claim 1, wherein the DDN message is used to instruct the MME to send a paging message to a base station in a tracking area (TA) list of the user equipment, wherein the HPP indication is used to indicate that the priority of the user equipment is higher than the preset level.

4. The method according to claim 1, further comprising:
receiving, by the MME, the DDN message; and
determining, by the MME according to the DDN message after enabling an aggregate paging function, whether a priority of the user equipment is higher than the preset level; and
directly sending, by the MME in response to the received DDN message, the paging message to the base station in a tracking area (TA) list of the user equipment when the priority of the user equipment is higher than the preset level.

5. A non-transitory computer-readable medium storing computer instructions for execution by one or more processors, wherein the computer instructions instruct the one or more processors to perform the operations of:
receiving an aggregate paging indication from a mobility management entity (MME);
after receiving a downlink packet, obtaining quality of service (QoS) information of a user equipment that is to receive the downlink packet, wherein the QoS information of the user equipment comprises a QoS class identifier (QCI) and allocation/retention priority (ARP) information;
determining whether a priority of the user equipment is higher than a preset level according to the QoS information of the user equipment; and
in response to determining that the priority of the user equipment is higher than the preset level, sending, to the MME, a downlink data notification (DDN) message that carries a high priority paging (HPP) indication, wherein
the DDN message is used to instruct the MME to send a paging message to a base station in a tracking area (TA) list of the user equipment, wherein the HPP indication is used to indicate that the priority of the user equipment is higher than the preset level.

6. The non-transitory computer-readable medium according to claim 5, wherein the aggregate paging indication is used to indicate that the MME is to send a paging message by means of aggregate paging.

7. The non-transitory computer-readable medium according to claim 5, wherein the DDN message is used to instruct the MME to send a paging message to a base station in a tracking area (TA) list of the user equipment, wherein the HPP indication is used to indicate that the priority of the user equipment is higher than the preset level.

8. A system, comprising a serving gateway (SGW) and a mobility management entity (MME); wherein:
The SGW is configured to:
receive an aggregate paging indication from the MME;
obtain quality of service (QoS) information of a user equipment that is to receive the downlink packet after receiving a downlink packet, wherein the QoS information of the user equipment comprises a QoS class identifier (QCI) and allocation/retention priority (ARP) information;
determine whether a priority of the user equipment is higher than a preset level according to the QoS information of the user equipment; and
in response to determining that the priority of the user equipment is higher than the preset level, send, to the MME, a downlink data notification (DDN) message that carries a high priority paging (HPP) indication.

9. The system according to claim 8, wherein the aggregate paging indication is used to indicate that the MME is to send a paging message by means of aggregate paging.

10. The system according to claim 8, wherein the DDN message is used to instruct the MME to send a paging message to a base station in a tracking area (TA) list of the user equipment, wherein the HPP indication is used to indicate that the priority of the user equipment is higher than the preset level.

11. The system according to claim 8, wherein the MME is configured to:
receive the DDN message; and
determine, according to the DDN message after enabling an aggregate paging function, whether a priority of the user equipment is higher than the preset level; and
directly send, in response to the received DDN message, the paging message to the base station in a tracking area (TA) list of the user equipment when the priority of the user equipment is higher than the preset level.

* * * * *